United States Patent

[11] 3,617,203

| [72] | Inventor | William Gordon Rose<br>Berkeley, Calif. |
|---|---|---|
| [21] | Appl. No. | 15,303 |
| [22] | Filed | Feb. 27, 1970 |
| [45] | Patented | Nov. 2, 1971 |
| [73] | Assignee | The United States of America as represented by the Secretary of Agriculture |

[54] MODIFICATION OF WOOL WITH BIS-(CHLOROMETHYL)-$\beta$-PROPIOLACTONE
3 Claims, No Drawings

[52] U.S. Cl. .................................................. 8/128, 8/127.6, 117/137
[51] Int. Cl. .................................................. D06m 13/12, D06m 13/10
[50] Field of Search .................................... 8/128, 127.6

[56] References Cited
UNITED STATES PATENTS

| 2,517,573 | 8/1950 | Jones et al. | 8/128 X |
| 2,672,397 | 3/1954 | Lundgren et al. | 8/128 X |
| 2,717,194 | 9/1955 | Rose et al. | 8/128 X |
| 3,282,640 | 11/1966 | Koenig et al. | 8/128 |

Primary Examiner—George F. Lesmes
Assistant Examiner—J. Cannon
Attorneys—R. Hoffman, W. Bier and W. Takacs ABSTRACT: Wool is reacted with $\alpha,\alpha$-bis-(chloromethyl)-$\beta$-propiolactone, yielding a modified wool which exhibits an enhanced resistance to shrinking. Also the product is less inflammable than the untreated wool.

MODIFICATION OF WOOL WITH BIS-(CHLOROMETHYL)-β-PROPIOLACTONE

A nonexclusive, irrevocable, royalty-free license in the invention herein described throughout the world for all purposes of the United States Government, with the power to grant sublicenses for such purposes, is hereby granted to the Government of the United States of America.

This invention relates to and has among its objects the provision of novel modified wool products and novel methods for preparing them. Further objects of the invention will be evident from the following description wherein parts and percentages are by weight unless otherwise specified.

It has been previously shown that wool may be modified by reaction with β-propiolactone. See Jones and Lundgren U.S. Pat. No. 2,517,573; Lundgren, Rose, and Jones U.S. Pat. No. 2,672,397; and Rose and Lundgren U.S. Pat. No. 2,717,194. A primary feature of wool modified by reaction with β-propiolactone is that it exhibits an increased ability to felt. When the modified wool is subjected to mechanical working (for example, agitated in an aqueous medium) the individual fibers become irreversibly interlocked, and the degree to which this felting action takes place is greater than in the case of natural (unmodified) wool.

The enhanced felting ability of β-propiolactone-modified wool is of advantage where it is desired to produce felts. On the other hand, it is a disadvantage where one desires to produce fabrics having dimensional stability. Because of the high-felting ability of β-propiolactone-modified wool, this product when subjected to washing will shrink to a greater extent than will natural wool.

It has now been found that wool may be modified with α, α-bis-(chloromethyl)-β-propiolactone. A surprising aspect of the so-modified wool is that it exhibits a decreased ability to felt. Accordingly, when the product is washed it will retain its original dimensions to a greater extent than will natural (unmodified wool). As a result, the invention is useful for preparing fabrics, garments, and other textile products which are dimensionally stable, i.e., shrink-resistant. Moreover, the modification is durable--the shrink-resistant property is retained despite laundering and dry cleaning of the modified wool products. The durability of the modification achieved by the invention is believed to be due to the fact that the lactone is chemically combined with the wool. However, the mechanism by which this chemical combination or bonding occurs is not known.

Another valuable asset of the invention is that the modification treatment does not impair the intrinsic properties of the wool. For example, the treatment does not impair the color, tensile strength, or the hand of the textile. A further advantage is that the products of the invention are less flammable than natural wool. The products of the invention are suitable for all the conventional uses of textiles such as fabrication of garments of all kinds.

The compound α, α-bis-(chloromethyl)-β-propiolactone used in accordance with the invention is a known substance having the structure:

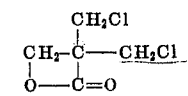

For the sake of brevity, this compound will be hereinafter referrred to as BCP.

The modification of wool in accordance with the invention involves, essentially, contacting the wool with BCP so that it can react with this reagent. The proportion of BCP to wool can be varied over a wide range depending on the degree of modification desired. Generally, the proportion of reactants is at least 0.1 part of BCP per part of wool. Preferably, a greater proportion of BCP is used to ensure complete reaction. The unreacted portion of the lactone can easily be separated from product, as by extraction with a solvent. In most cases it is preferred to employ the BCP in solution form. Any inert solvent for BCP can be used, for example, ether, chloroform, carbon tetrachloride, benzene, toluene, or the like. Usually as a matter of convenience, the reaction is conducted at room temperature. However, the temperature may in general be from about 20° to about 100° C., the rate of reaction increasing as the temperature is increased.

The reaction may be carried out under anhydrous conditions. Usually, however, it is preferred that moisture be present in the wool when it is contacted with BCP. The moisture in the wool may be the normal amount (usually about 10-15 percent) present when this fiber is stored under ordinary conditions, that is, in contact with the atmosphere. Alternatively, and preferably, the wool is deliberately increased in moisture content prior to initiating the reaction. The moistening may be done, for example, by saturating the wool with water and then passing it through wringer rolls so that the wool has a moisture content of about 20-50 percent.

The time of reaction will, of course, depend on many factors such as the type of wool and the moisture content thereof, the concentration of BCP, the temperature and type of product desired. In general, the reaction is continued until wool exhibits an increase in weight (due to uptake of BCP) of about from 1 to 40 percent (dry basis). After the reaction of the wool and BCP has been carried out, the modified wool product is mechanically treated as by wringing, centrifuging, or the like to remove excess reagent and solvent. Any residual BCP may be removed by washing with an inert solvent, as for example, ether, carbon tetrachloride, benzene, chloroform, or the like. Alternatively, or additionally, the product may be washed in a conventional soap and water or detergent and water formulation. After drying the product is ready for use or sale.

The process of the invention may be applied to wool in any physical form, for example, yarns, bulk fibers, top, webbing, roving, woven or knitted fabrics, garments or garment parts.

The invention is further demonstrated by the following illustrative example. The tests referred to therein were conducted as follows:

Accelerotor shrinkage test: The wool samples are milled at 1,700 r.p.m. for 2 minutes at 40°-42° C. in an Accelerotor with 0.5 percent sodium oleate solution, using a liquor-to-wool ratio of 50 to 1. After this washing operation the samples are dried and measured to determine their area and the shrinkage calculated from the original area. The Accelerotor is described in the American Dyestuff Reporter, VOl. 45, p. 685, Sept. 10, 1956. A single 2-minute wash in this device is equivalent to about 15 home launderings.

Flammability test: In accordance with ASTM procedure D1230. In this test a longer burning time indicates a slower rate of flame propagation, hence a lesser degree of flammability.

A. PREPARATION OF MODIFIED WOOL

A piece of wool cloth (9.2 g.) was soaked in water, then spun in a centrifuge. The moistened wool contained approximately 35 percent $H_2O$.

The moistened wool cloth was immersed in a solution of 6.5 g. BCP in 150 ml. carbon tetrachloride, and held therein 90 hours at room temperature. Then the cool was removed from the solution, successively washed with carbon tetrachloride, ethanol, water, and finally air-dried. The uptake of BCP by the wool was 34.9 percent. Despite this high uptake of the applied reagent, it was observed that the modified wool had an excellent soft hand.

B. SHRINKAGE TESTS

The modified wool product and a sample of the untreated wool were tested for shrinkage by applying three successive washings in the Accelerotor. The results are:

| Product | Area shrinkage (cumulative), % | | |
|---|---|---|---|
| | 1st wash | 2nd wash | 3rd wash |

| | | | |
|---|---|---|---|
| Modified wool | 0 | 0 | 0 |
| Untreated wool (control) | 22.6 | 47.5 | 57.8 |

C. FLAMMABILITY TESTS

Strips of the modified wool were tested for flammability and it was found that the average burning time was 18.4 seconds. Strips of the untreated wool tested in the same manner had an average burning time of 11.3 seconds.

Having thus described the invention, what is claimed is:

1. A process for modifying wool which comprises contacting wool with a solution of $\alpha, \alpha$-bis-(chloromethyl)-$\beta$-lactone in an inert solvent for said lactone and maintaining said contact at a temperature of about from 20° to 100° C. until there is formed a modified wool containing about from 1 to 40 percent of the lactone.

2. The process of claim 1 wherein the wool, prior to contact with the solution of the lactone, has a moisture content of at least 10 percent.

3. Wool fibers modified by the process of claim 2.

* * * * *